July 22, 1958  A. T. VAN URK ET AL  2,844,786
MAGNETIC SYSTEM
Filed July 22, 1954

INVENTORS
AREND THOMAS VAN URK
JOHANNES MEYER CLUWEN
BY
AGENT

United States Patent Office 2,844,786
Patented July 22, 1958

2,844,786

MAGNETIC SYSTEM

Arend Thomas van Urk and Johannes Meyer Cluwen, Eindhoven, Netherlands, assignors, by mesne assignments, to North American Philips Company, Inc., New York, N. Y., a corporation of Delaware Application July 22, 1954, Serial No. 445,068

Claims priority, application Netherlands April 23, 1951

4 Claims. (Cl. 323—92)

This invention relates to a magnetic system comprising a magnetic circuit of highly-permeable ferromagnetic material, one or more windings for producing an alternating magnetic field in the ferromagnetic circuit and a permanent magnet for producing a premagnetising field in the ferromagnetic circuit. This application is a continuation in part of a copending application Serial No. 264,979, filed January 4, 1952, now abandoned.

More particularly, the invention may be applied to a transformer, for example, for transmitting pulsatory oscillations such as radar pulses. Such pulsatory oscillations have a marked asymmetry, that is to say, their value in the positive phase of the oscillation differs considerably from that in the negative phase. Consequently, in the absence of the premagnetising field, such an oscillation will drive the ferromagnetic material of the transformer in one phase to a much higher induction than in the other phase. Equal induction for the two phases may be accomplished by providing in the magnetic circuit a premagnetising field which brings the ferromagnetic material, for example, almost to saturation. In this case, upon occurrence of a pulsatory oscillation, the B–H curve of this material is traversed from the saturation value in one direction to the saturation value in the other or opposite direction.

According to the present invention, a system comprising a closed magnetic circuit of highly-permeable ferromagnetic core material is provided with one or more windings for producing an alternating magnetic field in the ferromagnetic circuit, and a permanent magnet for producing a constant premagnetising field in the ferromagnetic circuit which saturates the latter in the absence of current through the windings. The magnet is included in the circuit without electrical screening, e. g., short-circuit windings, and is made of substantially non-conductive permanent magnetic material having a coercive field strength of at least 750 Oersted and a ratio between the remanent induction and the coercive field strength of not more than 4.

A magnetic leakage field shunts the magnet. Means are provided for applying pulsatory currents to one of the windings to produce a field Hs in the core of sufficient intensity to drive the ferromagnetic material to saturation in the opposite direction. The leakage circuit shunting the magnet has an intensity such that the field in the magnet never exceeds the vanishing field strength $_IH_C$ of the magnet, whereby the magnet is prevented from being demagnetised.

In order that the invention may be more clearly understood and readily carried into effect, it will now be described more fully with reference to the accompanying diagrammatic drawing, given by way of example, in which.

Figure 1:
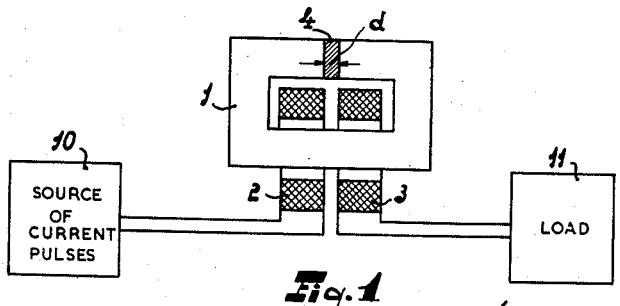
Fig. 1 shows one embodiment of a system according to the invention.
Figure 3:
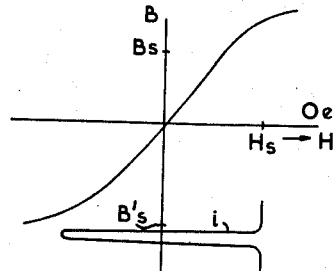
Fig. 3 shows the B–H curve for the merromagnetic core material.

Referring now to Fig. 1, a magnetic system, for example, a pulse transformer, comprises a closed ferromagnetic circuit including a core 1 having a primary winding 2 and a secondary winding 3. In the absence of a premagnetising field, a pulsatory oscillation fed to the primary winding 2 from a source 10 would drive the ferromagnetic material in one direction to saturation, but in the other direction, saturation would not be reached. In order, therefore, to drive the material in both phases to an equal induction so that larger pulses can be utilised by the transformer, the circuit 1 includes a permanent magnet 4 in series which brings the ferromagnetic material of the circuit 1 almost to saturation in the absence of current pulses. The pulsatory oscillations $i$ (Fig. 3) supplied by the source 10 then cause the ferromagnetic core material of the circuit 1 to traverse a cycle of magnetisation from one saturation value to the other. The pulse currents induced in the secondary winding 3 is supplied to a load 11.

The invention is based on the folowing considerations: Normally, permanent magnetic material has a low permeability. In order, therefore, that it may offer a minimum reluctance to the pulsatory alternating fields, the thickness $d$ of the magnet 4 is minimised. If the magnet 4 were made of electrically conductive permanent magnetic material, the magnetic alternating flux would induce eddy currents in this material and considerable losses would ensue. It has been suggested to avoid such eddy current losses by coating the magnet 4 with a layer of good electrical conductivity to prevent magnetic alternating flux from penetrating the magnet 4. However, this results in that the reluctance offered by the magnet 4 with its conductive layer in the ferromagnetic circuit is considerably higher. It has also been suggested to pulverise the permanent magnetic material and to incorporate it in a non-conductive binder, for example, synthetic resin. Although this results in a decrease in eddy current losses, the permanent magnetic properties of the magnet thus formed are adversely affected. In addition, in principle, the disadvantage of the permanent magnet bringing about considerable hysteresis losses is not removed.

In accordance with the invention, the permanent magnet is included in the circuit without the electrical screening of a layer of good electrical conductivity, referred to above, the permanent magnetic material of the magnet being required to satisfy the following requirements:

(1) That the coercive field strength must exceed 750 Oersted, (2) That it must be substantially non-conductive, and (3) That the ratio between the remanence and the coercive field strength must be less than 4. Such permanent magnetic materials are described, for example, in Philips Technical Review, vol. 13, No. 7 and are characterised by a structure of substantially non-cubic crystals of polyoxides of iron and at least one of the metals barium, strontium and lead and, in some cases, calcium, so that they can be manufactured from cheap, comparatively plentiful materials.

Satisfaction of the above-mentioned requirement 1 enables the use of a magnet the thickness $d$ of which is small enough for the reluctance offered thereby to remain very low. As a result of the condition 2 eddy current losses are substantially avoided. Most permanent magnetic materials made of metal oxides have in practice already a sufficiently high specific resistance, for example, higher than 100 ohm cm., for the eddy current losses to be negligible as compared with the losses of the ferromagnetic material. At frequencies of, say, several mc./sec. the above-mentioned material in particular has a specific resistance higher than $10^5$ ohm cm.

However, this requirement is not sufficient to keep the losses low. The usual permanent magnetic material, comprising a base of, for example, aluminum-cobalt-nickel and having a ratio between the remanent induction $B_r$ and the coercive field strength $_BH_C$ of about 12, have not only a high conductivity but also high hysteresis losses. These losses are materially reduced by choosing a permanent magnetic material of which the ratio $B_r:_BH_C$ is less than 4:1. As a matter of fact, with the first-mentioned material, the slope of the hysteresis loop which is described at a specific working point $H_w$, $B_w$ is considerably lower than the ratio $B_r:_BH_C$; but the lower this ratio, the more the hysteresis loop approaches the magnetising curve shown so that the volume of the loop and hence the losses are decreased.

A further requirement which the permanent magnetic material must satisfy if the device is used as a pulse transformer is that it should have a non-cubic crystal structure and that the field strength of disappearance $_IH_C$ (that is to say the field strength at which the magnetisation I becomes equal to zero and hence the material may be considered as not being present) should be preferably at least 1.2 times the coercive field strength $_BH_C$. The usual magnetic materials comprising a base of, for example, aluminium cobalt-nickel, have a value for this ratio which differs very little from 1, for example, 1.01. Although this value increases for permanent magnetic materials made of metal oxides, it frequently remains excessively low. Among the above-mentioned permanent magnetic materials of this kind, having, for example, a hexagonal crystal structure, there are a great number with which this ratio is exceeded by far, for example, is equal to 3. Generally, it is found that $_IH_C$ increases if a poly-crystalline sample of this material is pulverised by grinding.

Figure 2:
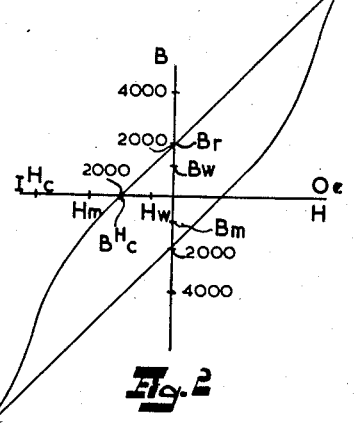
Fig. 2 shows the B–H curve for a permanent magnetic material suitable in the system of the invention.

The reason for this requirement is as follows:

Whereas in the absence of a pulse the permanent magnetic material is operated at a point $H_w$, $B_w$ of its cycle of magnetisation (Fig. 2) in the proximity of the remanent induction $B_r$, the occurrence of a pulse will cause this curve to be transversed in the direction of the coercive field strength $_BH_C$; this value will be passed, after which a point $H_m$, $B_m$ is reached the induction value $B_m$ of which is about equal and opposite to the value $B_w$. This is due to the fact that the ferromagnetic material of the circuit 1 is operated approximately at its saturation point $H_s$, $B_s$ (Fig. 3) and is brought to the opposed saturation $B_s'$ by the pulsatory oscillation $i$. Since the magnetic flux in the series circuit 1 is continuous and $B_s'$ is equal and opposed to $B_s$, $B_m$ must also be equal and opposed to $B_w$, the saturation of the ferromagnetic medium consequently preventing the occurrence of any higher value of $B_m$, and hence of $H_m$.

In these circumstances, the permanent magnetic material must have a field strength of disappearance $_IH_C$ about equal to or higher than the value $H_m$ in order that the material may not be operated by the pulsatory oscillation on an irreversible part of its curve whereby its magnetic properties are greatly affected, i. e., it is demagnetised. For the non-cubic materials with which the magnetisation of the various crystals have a defined marked preferential direction, so-called anisotropic magnets, it is found that the field strength at which the cycle of magnetisation becomes irreversible is located in the neighbourhood of and in some cases lower than the said field strength of disappearance. The material available commercially under the name of "vectolite" having a composition of cobalt ferrous ferrite, which does have the first-mentioned properties, has, by reason of its cubic crystal structure, an irreversible curve even at a much lower field strength. In practice it is found that a ratio $_IH_C:_BH_C$ of 1.2:1 is assumed to form about the lowest limit.

It will be apparent from the foregoing that the closer the value $H_w$, the operating point of the magnet, is in the proximity of the value $_BH_C$, the lower will be the values $B_w$, $B_m$ and $H_m$ and hence the more remote the value $H_m$ will remain from the value $_IH_C$. For achieving this condition, various means are available. (1) Use may be made of a ferromagnetic material having a low saturation induction $B_s$ with the result that $B_w$ and $B_m$ are also low. Such materials are described, for example, in U. S. Patents 2,452,529; 2,452,530; 2,452,531.

(2) The device may be given such geometry that the permanent magnetic body has a considerable leakage field by providing a magnetic shunt in parallel with the magnet 4 or increasing the reluctance of the ferromagnetic circuit 1 by the provision of an airgap in the circuit 1, preferably of such dimensions that the total width of the airgap and the permanent magnet 4 remains even very low. This construction is shown in Fig. 4.

Figure 4:
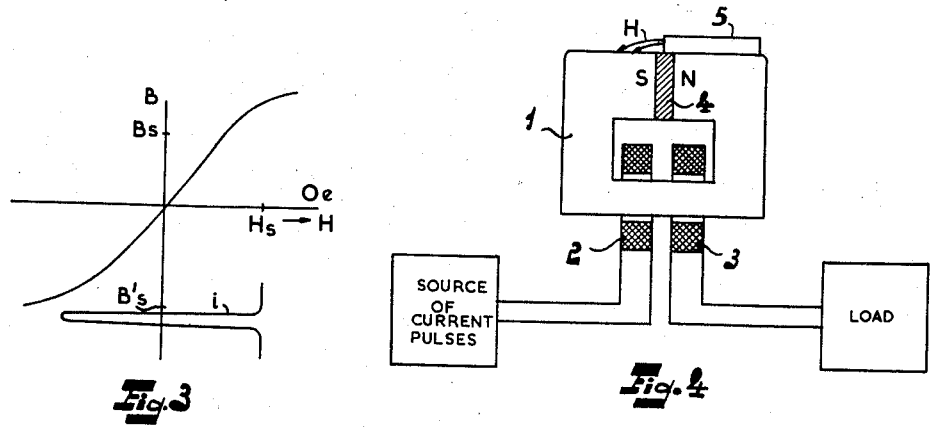
Fig. 4 shows one form of circuit of the invention.

Referring to Fig. 4 the magnetic system includes a magnetic shunt 5 parallel to the permanent magnet 4 due to which a considerable leakage field H is produced. Consequently the value of $B_w$ effective to produce a premagnetising field in the magnetic circuit 1 is decreased by this field H so that the values $B_m$ and $H_m$ are decreased accordingly to provide better protection of the permanent magnet 4 against demagnetisation by excessive current pulses through the windings 2 and 3.

The invention can be carried into effect with satisfactory results with any device in which in addition to the permanent magnetic field large alternating fields occur. Thus, for example, one phase of a comparatively high alternating voltage can be suppressed by bringing the ferromagnetic circuit 1 to saturation with the use of the permanent magnet 4, and thus the permanent magnetic material will not be driven to a value exceeding a value corresponding to saturation in the opposite direction of the ferromagnetic material.

A particular use is that in which the premagnetising field of the body 4 serves to compensate any direct current premagnetisation of the current passing through one or more of the windings. Such a transformer may be used, for example, as a loudspeaker transformer in a wireless receiver or as an output transformer for the line time base of a television receiver, the permanent magnetic material being operated at its coercive field strength $_BH_C$ and the alternating current passing through the winding driving this material in some cases to almost double the coercive field strength. In this case, the ratio $_IH_C:_BH_C$ must consequently be proportionately higher.

While we have described our invention in connection with specific embodiments and applications, other modifications thereof will be readily apparent to those skilled in this art without departing from the spirit and scope of the invention as defined in the appended claims.

What is claimed is:

1. A pulse transformer comprising a ferromagnetic core saturating at a given field strength $H_s$ and defining an air-gap therein, primary and secondary windings on said core, a thin flat permanent magnet disposed in said air-gap and defining with said core a low reluctance, closed magnetic circuit free of short-circuit windings, said magnet being magnetized in its thin direction and having a field intensity at which said core is saturated in one direction in the absence of current through said windings, said permanent magnet consisting of an electrically non-conductive permanent magnetic material having a non-cubic crystal structure and a coercive field strength $_BH_C$ of at least 750 Oersted and a vanishing field strength $_IH_C$ at least 1.2 times greater than the coercive field strength $_BH_C$ and a ratio of remanence $B_r$ to coercive field strength $_BH_C$ of less than 4:1, said magnet being adapted to withstand demagnetization without the use of short-circuit windings, and means to supply a current pulse to said primary winding to reverse the flux flow through said magnet and to cause said core to saturate in an opposite direction at a flux value limiting the reversing field strength through said magnet to a value less than the vanishing field strength of the magnet.

2. A pulse transformer as claimed in claim 1 in which said permanent magnetic material consists essentially of polyoxides of iron and at least one of the metals selected from the group consisting of barium, strontium and lead.

3. A transformer system for pulsatory currents comprising a ferromagnetic core saturating at a given field strength and defining an air-gap therein, magnetically coupled primary and secondary windings on said core, a permanent magnet disposed in said air-gap and defining with said core a closed, series magnetic circuit free of short-circuit windings, said magnet having a field intensity at which said core is substantially saturated in one direction in the absence of current through said windings, magnetic shunt means in parallel with said magnet through which a magnetic leakage field is produced outside of said core, said permanent magnet consisting of an electrically non-conductive permanent magnetic material having a coercive field strength $_BH_C$ at least 750 Oersted and a vanishing field strength $_IH_C$ greater than the coercive field strength $_BH_C$ and a ratio of remanence $B_r$ to coercive field strength $_BH_C$ of less than 4:1, a source of pulse currents, means for applying a pulsatory current from said source to said primary winding of such magnitude to produce in said core a field $H_s$ of sufficient intensity to saturate said core in the opposite direction, said field $H_s$ reversing the flux through said permanent magnet and producing a given field in said permanent magnet and a leakage field outside of said core, said leakage field having a field intensity at which said field in said permanent magnet is limited to a value less than said vanishing field strength $_IH_C$ of said permanent magnet to prevent demagnetisation of the permanent magnet, and means coupled to said secondary winding to derive pulses therefrom.

4. A transformer system as claimed in claim 3 wherein said permanent magnetic material consists essentially of polyoxides of iron and at least one of the metals selected from the group consisting of barium, strontium and lead.

References Cited in the file of this patent

UNITED STATES PATENTS

| | | | |
|---|---|---|---|
| 2,218,711 | Hubbard | Oct. 22, | 1940 |
| 2,381,763 | McCreary | Aug. 7, | 1945 |
| 2,680,820 | Duffing | June 8, | 1954 |
| 2,699,530 | Latimer | Jan. 11, | 1955 |

UNITED STATES PATENT OFFICE
CERTIFICATE OF CORRECTION

Patent No. 2,844,786            July 22, 1958

Arend Thomas van Urk et al.

It is hereby certified that error appears in the printed specification of the above numbered patent requiring correction and that the said Letters Patent should read as corrected below.

Column 1, line 34, for "premagnestising" read -- premagnetising --; column 2, line 1, for "merromagnetic" read -- ferromagnetic --; column 3, line 43, for "transversed" read -- traversed --; line 52, for "$Bs'$" read -- $B_s'$ --; column 5, line 22, for "at least" read -- of at least --.

Signed and sealed this 21st day of October 1958.

(SEAL)
Attest:

KARL H. AXLINE            ROBERT C. WATSON

Attesting Officer            Commissioner of Patents